Patented Feb. 16, 1926.

1,573,687

UNITED STATES PATENT OFFICE.

HARRY E. DUBIN, OF NEW YORK, N. Y., ASSIGNOR TO HERMAN A. METZ, OF NEW YORK, N. Y.

MALT SIRUP AND PROCESS OF PREPARING THE SAME.

No Drawing.   Application filed April 16, 1923.   Serial No. 632,535.

*To all whom it may concern:*

Be it known that I, HARRY E. DUBIN, a citizen of the United States, residing at New York city, in the county of New York and State of New York, have invented certain new and useful Improvements in Malt Sirup and Processes of Preparing the Same, of which the following is a specification.

This invention relates to a process for the purification of wort, and particularly for the decolorization, clarification and deodorization of wort without destruction of the enzyme activity thereof. The invention relates further to a purified, that is, a decolorized, deodorized and clarified wort and products prepared therefrom, such as malt sirup having a high or substantially unimpaired enzyme activity.

Wort and malt sirup prepared therefrom have a variety of uses dependent upon their enzyme activity, for instance in bread making and in the textile industry as a destarching agent and in the preparation of drugs and beverages. In these uses, however, odor, color and cloudiness of the material are objectionable. For instance, dark-brown-colored malt sirup cannot be used for making white bread, and when used as a destarching agent the cloth is undesirably colored.

It has been attempted heretofore to decolorize wort by means of chemical bleaching agents, such as sodium hydrosulfite, but the enzyme activity is thus largely or entirely destroyed. I have found that even a too vigorous treatment of the wort with charcoal, for instance by vigorously shaking a mixture of the wort with charcoal, will destroy the enzyme activity of the wort.

My process therefore consists in subjecting wort to a mild treatment with a purifying agent, such as charcoal, fuller's earth, or the like, which when not too vigorously applied will remove the color, odor and cloudiness from the wort without destroying its enzyme activity. The preferred purifying agent is charcoal, and the invention will be illustrated hereinafter by reference to the purification of wort by means of charcoal, it being understood, however, that the invention is not limited to the use of charcoal or to the specific procedure described.

The purifying treatment may be applied to wort prepared in the customary manner and ordinarily used for the preparation of malt sirup by concentration or it may be applied for purifying malt sirup, in which case however it is necessary to dilute the malt sirup and subject the diluted solution to the purifying treatment and then reconcentrate it. The process preferably is applied to wort prior to concentration to form malt sirup. The purifying treatment may be carried out in a variety of ways, for instance by mixing the purifying agent with the wort and then filtering, centrifuging or settling to separate the purifying agent, or by filtering the wort through a bed of the purifying material.

A satisfactory procedure is as follows: A small tower about 15 inches in height and 6½ inches in diameter at the top and tapered to a ½-inch neck at the bottom is filled to about one-third of its height with alternate layers of pebbles and charcoal, each layer being about 1 inch thick. Any suitable decolorizing charcoal may be used, but the thickness of the bed through which the wort is passed and the rate of flow will of course depend upon the decolorizing activity of the charcoal. In the present example a decolorizing charcoal, known as Norit, of about 80 mesh is used. The wort is permitted to flow through the gravel-charcoal filter by gravity or slight suction or pressure may be applied, if desired or necessary to increase the rate of flow. The wort should not be left in contact with the charcoal for a longer time than is necessary to accomplish the desired purification and the rate of flow of the wort through the charcoal should therefore be increased to the maximum at which satisfactory purification is obtained.

The filtration is carried out at ordinary room temperatures. It is evident that the size of the tower and the thickness of the charcoal filter may be varied as desired, provided that the rate of flow of the wort through the charcoal or the time of contact therewith is varied so as to avoid a too vigorous or prolonged action and the destruction of the enzyme activity.

The purified wort is practically colorless, odorless and clear and retains practically completely its original enzyme activity. When concentrated in vacuum as is customary in the preparation of malt sirup from wort, the resulting malt sirup is practically colorless or only slightly yellow, almost odorless, clear and possesses practically all of the enzyme activity of the original or raw wort.

The malt sirup product may be used in the same manner and for the same purposes as the dark brown odorous and cloudy malt sirup heretofore employed but has the advantages of imparting to the products practically no color, odor or cloudiness. It may also be used in the manufacture of white bread and as a destarching agent and in the preparation of medicines and beverages without the objections heretofore referred to.

The most objectionable characteristic of untreatedd wort and malt sirup for most of its uses is its color, and the principal object of the invention therefore is the decolorization of the wort and the production therefrom by concentration of a substantially colorless malt sirup. The clarification and deodorization may be regarded as incidental to the decolorization, although these effects also are of substantial value. The decolorization of the wort affords a ready means for controlling the purifying treatment. By limiting the treatment to an extent only sufficient to accomplish the desired decolorization, the destruction of the enzyme activity of the wort is avoided.

I claim:

1. Process which comprises subjecting wort containing diastase to a mild treatment with a solid adsorbent decolorizing agent sufficient to decolorize the wort but insufficient to substantially reduce its enzyme activity.

2. Process which comprises subjecting wort containing diastase to the action of a solid adsorbent decolorizing agent and stopping the action thereof before the enzyme activity of the wort is materially impaired.

3. Process which comprises filtering wort containing diastase through a bed of decolorizing charcoal, and regulating the period of contact of the wort with the charcoal to a time sufficient to produce substantially complete decolorization but insufficient to materially impair its enzyme activity.

4. As a new product, a substantially colorless wort derived from a colored diastase-containing wort, by subjecting said colored diastase-containing wort to a mild treatment with a solid adsorbent decolorizing agent sufficient to decolorize the same but insufficient to substantially reduce its enzyme activity, said colorless wort containing substantially all of the diastase of said colored diastase-containing wort.

5. As a new product, a substantially colorless, odorless and clear wort derived from a colored, odoriferous, and cloudy diastase-containing wort, by subjecting said colored, odoriferous and cloudy diastase-containing wort to a mild treatment with a solid adsorbent decolorizing agent sufficient to decolorize, deodorize and clarify the same but insufficient to substantially reduce its enzyme activity, said colorless, odorless and clear wort containing substantially all of the diastase of said colored, odoriferous and cloudy wort.

6. As a new product, a substantially colorless malt sirup derived from a colored diastase-containing wort, but subjecting said colored diastase-containing wort to a mild treatment with a solid adsorbent decolorizing agent sufficient to decolorize the same but insufficient to substantially reduce its enzyme activity and then concentrating the decolorized wort, said sirup containing substantially all of the diastase of said wort.

7. As a new product, a substantially colorless, odorless and clear malt sirup derived from a colored, odoriferous and cloudy diastase-containing wort, by subjecting said colored, odoriferous and cloudy diastase-containing wort to a mild treatment with a solid adsorbent decolorizing agent sufficient to decolorize, deodorize and clarify the same but insufficient to substantially reduce its enzyme activity, and then concentrating the decolorized, deodorized and clarified wort, said sirup containing substantially all of the diastase of said wort.

In testimony whereof, I affix my signature.

HARRY E. DUBIN.